S. FRIEND.
Animal-Traps.
No. 151,484.
Patented June 2, 1874.
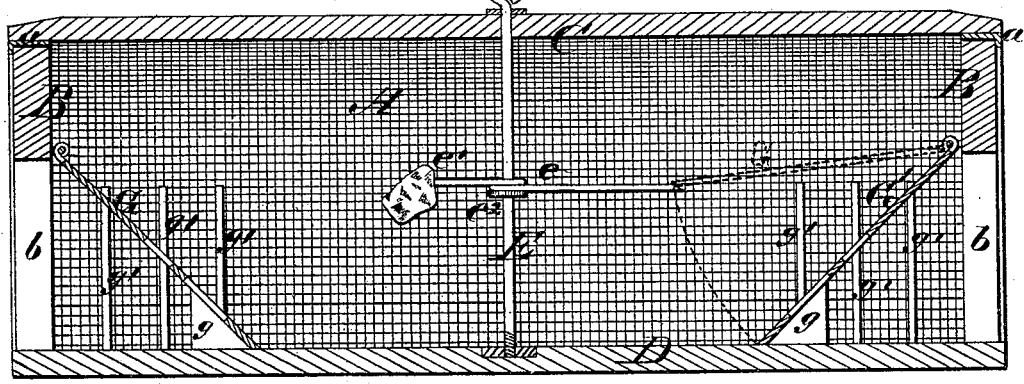
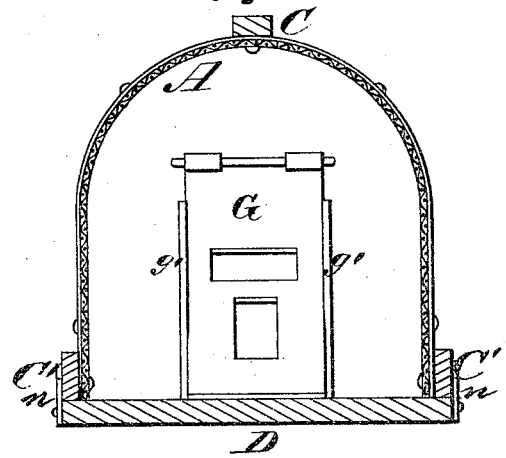

UNITED STATES PATENT OFFICE.

SAMUEL FRIEND, OF DECATUR, ILLINOIS.

IMPROVEMENT IN ANIMAL-TRAPS.

Specification forming part of Letters Patent No. 151,484, dated June 2, 1874; application filed November 15, 1873.

*To all whom it may concern:*

Be it known that I, SAMUEL FRIEND, of Decatur, in the county of Macon and State of Illinois, have invented a new and valuable Improvement in Animal-Traps; and I do hereby declare that the following is a full, clear, and exact description of the construction and operation of the same, reference being had to the annexed drawings making a part of this specification, and to the letters and figures of reference marked thereon.

Figure 1 of the drawings is a representation of a longitudinal sectional view of my animal-trap. Fig. 2 is a transverse section of the same.

This invention has relation to animal-traps; and it consists in constructing the body of the trap of arched form, and with a removable bottom, which latter is secured to the arched portion by means of a vertical screw-rod, on which is a swiveling bait-holder and trigger, in combination with hinged doors applied to the entrances into the trap, and so arranged relatively to said trigger that one or the other door can be held up thereby when it is desired to set the trap, as will be hereinafter explained.

In the annexed drawings, A represents an arch, which is made of gauze-wire secured to end pieces B B that are connected together by means of longitudinal strips C C′ C′. D represents the imperforated bottom of the trap, which is provided with side lips $n$ $n$, between which the arch A is fitted, which lips allow this arch to be readily adjusted in place on the bottom D, and prevent lateral displacement thereof. In the center of the trap is a vertical rod, E, having an eye-handle on one end and a screw-thread on the other end. This rod E is passed through the top piece C and screwed into the bottom board D, thus holding the latter securely to the arch. A collar, $e^2$, is secured on the rod E, on which rests a swiveling bait-arm, $e^1$, and a trigger-arm, $e$, which are of one piece of wire, bent so as to leave an eye at the middle of its length. The bait-holding arm $e^1$ has a hook formed on it, to which the bait is fixed, and the trigger-arm $e$ has its end flattened for a purpose hereinafter shown. G G′ are two perforated doors, which are hinged to the inner sides of the end pieces B B, in line with entrances $b$ $b$ for the animals, and which are constructed with angular heel-pieces $g$ at the sides and lower ends. On opposite sides of these doors G G′ wires $g'$ are arranged for preventing exit or entrance of an animal between them, except by its passing beneath the doors.

To set the trap it is only necessary to lift one of the doors and adjust the flattened end of the trigger-arm $e$ beneath the end of such door, as shown in Fig. 1. When an animal passes beneath the raised door and moves the bait the trigger will allow the door to fall, and thus entrap the animal, which can be removed from the trap by unscrewing the rod E and detaching the bottom D. The doors are inclined when closed, and allow animals to enter the trap by passing beneath them, but do not allow the entrapped animals to escape from the trap.

What I claim as new, and desire to secure by Letters Patent, is—

In an animal-trap, the arched cage A, with openings $b$ $b$ through its ends, provided with doors G G′, and fence-wires $g'$, in combination with the movable bottom D, held by a rod, E, on which swivels a bait-holder, $e'$, and a trigger, $e$, as and for the purposes described.

In testimony that I claim the above I have hereunto subscribed my name in the presence of two witnesses.

SAMUEL FRIEND.

Witnesses:
    R. LIDDLE,
    JUSTUS LUKENS.